UNITED STATES PATENT OFFICE 2,609,362

EMULSION POLYMERIZATION IN SYSTEMS CONTAINING AN ORGANIC HYDROPEROXIDE

Charles F. Fryling, Phillips, and Carl A. Uraneck, Borger, Tex., assignors to Phillips Petroleum Company, a corporation of Delaware No Drawing. Application October 4, 1948, Serial No. 52,783

16 Claims. (Cl. 260—84.1)

This invention relates to the production of polymeric materials of high molecular weight. In one embodiment this invention relates to the production of synthetic elastomers. In a preferred embodiment, this invention relates to production of synthetic rubber by emulsion polymerization at subfreezing temperatures.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures the so-called redox recipes have been provided. In these recipes selected combinations of an oxidant, a reductant, and an oxidation catalyst are generally employed. The oxidant may comprise an inorganic peroxide, an organic peroxide or hydroperoxide, pernitrate, persulfate, permanganate, and the like. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like.

We have now found that, under certain specific conditions, the organic reducing agent may be eliminated from some of the above described systems, and also that results which are unexpected and highly desirable can be obtained. Through the use of the recipes of this invention more rapid conversion rates are obtained at low temperatures, such as 0 to −30° C., or lower, than are realized in systems wherein an organic reducing agent such as a sugar is employed. More rapid over-all conversion rates are also obtained at low temperatures than at high temperatures, and this fact is, indeed, surprising and wholly unpredictable. However, we may use such recipes at higher temperatures, such as up to 70° C., although modified procedures should be followed in order to obtain best results at temperatures above 0° C.

One object of this invention is to polymerize unsaturated organic compounds.

Another object of this invention is to produce an improved synthetic rubber.

A further object of this invention is to produce a synthetic rubber by polymerization of a monomeric material in aqueous emulsion at temperatures lower than ordinarily used.

Still another object of this invention is to increase the reaction rate in polymerizing unsaturated organic compounds in aqueous emulsion.

An additional object of this invention is to use effectively an organic hydroperoxide as a component of a polymerization recipe in the production of synthetic rubber by emulsion polymerization.

A still further object of our invention is to use cumene hydroperoxide as a key component of an emulsion polymerization to effect polymerization at temperatures below 0° C.

Other objects and advantages of this invention will become apparent, to one skilled in the art, from the accompanying disclosure and discussion.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugted butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discusssed and exemplified with reference to these typical reactants. With these specific monomers, it is usually preferred to use them together, in relative ratios of butadiene to styrene between 65:35 and 90:10 by weight.

According to the process of this invention the materials to be polymerized are caused to react in aqueous emulsion in the presence of a modifying agent, such as a mercaptan, an organic hydroperoxide, such as cumene hydroperoxide, an activator composition, such as one prepared from a ferrous salt such as ferrous sulfate and a pyrophosphate of a monovalent cation, such as an alkali metal or ammonium, and a suitable emulsifying agent. One procedure which may be employed for charging the ingredients to the reactor in a butadiene-styrene copolymerization is to disperse the hydroperoxide in the water solution of the emulsifying agent and charge this mixture to the reactor, after which the mercaptan, which is admixed with the styrene, is introduced. The butadiene is then added, the temperature of the reactants adjusted to the desired level, and polymerization started by injection of an aqueous dispersion of the ferrous sulfate-sodium pyrophosphate activator. The reactants are agitated throughout the polymerization period while the temperature is held constant. When the desired conversion has been reached the reaction is shortstopped, treated with an antioxidant, coagulated, and dried in the conventional manner. While the above described method represents a specific operating procedure, numerous variations may be employed.

The polymerization systems herein described possess numerous advantages. They are particularly applicable in low temperature recipes, say below 0° C., and it is at such temperatures that we usually prefer to operate. The conversion rates obtained are much more rapid at the preferred operating temperatures than are similar systems in which an organic reducing agent is present. Furthermore, the fact that no organic reducing agent is employed is significant from an economic viewpoint. The products have excellent properties, as shown by measurement of tensile strength, elongation, hysteresis, resilience, flex life, and abrasion loss. These improved results will be more fully illustrated hereinafter.

The activator may be added either continuously or intermittently. When continuous addition is practiced, the rate is adjusted in such a way that a given conversion is reached in an economically practicable length of time. On the other hand, if it is preferred to add the activator intermittently, aliquot portions may be introduced at intervals as frequently as required to maintain a substantially constant polymerization rate. As previously referred to herein, and as is illustrated by data in Examples XIV to XVIII, when the polymerization temperature is above 0° C. the polymerization reaction dies out at a low conversion unless activator ingredients are added during the course of the polymerization. However, as illustrated by Examples I to XIII this phenomenon is not present at lower polymerization temperatures. The reactants are agitated throughout the polymerization period while the temperature is held constant. After the entire quantity of activator has been added, in batch operation, agitation is continued for a short period, say from about five to about thirty minutes, to allow time for further conversion. The reaction is then shortstopped, the reaction effluent treated with an antioxidant, coagulated, and dried in the conventional manner.

An alternative procedure, which is also effective when carrying out emulsion polymerizations in our sugar-free redox systems, comprises charging all ingredients to the reactor except the organic hydroperoxide. After the butadiene is introduced and the temperature adjusted, polymerization is started by injection of a small amount of the organic hydroperoxide. The general procedure described above for the addition of the ferrous pyrophosphate activator is followed, the addition of the hydroperoxide being made either continuously or intermittently as desired. When operating at a polymerization temperature above 0° C., one or the other of these procedures is generally desirable, especially when conducting a batch polymerization, as will be shown more specifically hereinafter.

The organic hydroperoxides which are employed in the recipes of this invention may be represented by the formula

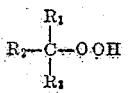

wherein $R_1$, $R_2$ and $R_3$ may be hydrogen, alkyl, aryl, or aralkyl groups, or $R_2$ and $R_3$ may be comprised in a ring structure such as, for example, a ring containing five or six carbon atoms. Various substituents such as alkyl, alkoxy, halogen, and the like may be present in $R_1$, $R_2$, and $R_3$. While cumene hydroperoxide itself

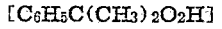

is a preferred material, other hydroperoxides such as, for example, tertiary butyl hydroperoxide [$(CH_3)_3CO_2H$], and methylcyclohexane hydroperoxide,

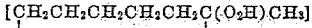

are also particularly effective. It is preferred that the organic hydroperoxide contain at least four and not more than twelve carbon atoms per molecule. However, no one organic hydroperoxide is to be considered a full equivalent of any other within the group specified.

When ferrous sulfate-sodium pyrophosphate activators are used in a preferred embodiment of our improved organic hydroperoxide systems, they may be prepared by heating a mixture of ferrous sulfate ($FeSO_4 \cdot 7H_2O$), sodium pyrophosphate ($Na_4P_2O_7 \cdot 10H_2O$), and water, preferably for the length of time required to effect maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of heating the activator is by means of an air oven or other suitable arrangement for controlling the surrounding temperature. If the temperature of the oven is set at 60° C., for example, a period of heating ranging from 30 to 90 minutes may be employed, the time being governed by the temperature desired in the activator. Generally a period of about 40 minutes is required to raise the temperature of the activator mixture to 60° C. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The amount of organic hydroperoxide should be within the range of 0.1 to 20 millimols, with 0.20 to 5 millimols preferred, per 100 parts of monomer. As illustrated in Example XII, preferred operation at subzero temperature is obtained with a mol ratio of these constituents at about 1:1:1–1.1, with the amount of each of these constituents between 0.1 and 2.5 millimols per 100 parts by weight of monomeric material. The amount of water employed in the preparation of the aqueous activator compositions is usually a quantity such that 10 to 30 parts of the aqueous activator mixture is added per 100 parts by weight of monomeric material. The same units of weight should, of course, be used throughout any one recipe, i. e., when the monomer is measured in pounds these other ingredients are measured in millipound mols.

The mol ratio of ferrous sulfate to sodium pyrophosphate may vary from 1:0.2 to 1:3.5, with the preferred ratio falling within the range from 1:0.35 to 1:2.8.

Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 180 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other low-boiling alcohols such as ethanol, however, are frequently too soluble in the liquid monomeric material to permit satisfactory operation. If the resulting latex tends to gel at low reaction temperatures, a larger proportion of aqueous phase should be used. Small amounts of electrolytes, such as potassium chloride, also sometimes will inhibit such gel formation.

Emulsifying agents which are applicable in these low temperature polymerizations are materials such as potassium laurate, potassium oleate, and the like. However, other emulsifying agents, such as non-ionic emulsifying agents, salts of alkyl aromatic sulfonic acids, salts of alkyl sulfate, and the like which will produce favorable results under the conditions of the reaction, can also be used in practicing the invention.

The pH of the aqueous phase may be varied over a rather wide range without producing deleterious effects on the conversion rate or the properties of the polymer. In general the pH may be within the range of 9.0 to 11.8, with the narrower range of 9.5 to 10.5 being most generously preferred.

The mercaptans applicable in this invention are usually alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 1 part per 100 parts of monomers may be used. Thus the amount of mercaptan is adjusted to suit the case at hand.

Temperatures applicable for the operation of this invention may range from −40 to +70° C., with the range −20 to +5° C. being preferred.

Advantages of this invention are illustrated by the following examples. The reactants, and their proportions, and the other specific ingredients of the recipes are presented as being typical and should not be construed to limit the invention unduly.

Example I

A butadiene-styrene copolymer was prepared according to the following recipe:

| | Parts by weight |
|---|---|
| Butadiene | 70 |
| Styrene | 30 |
| Mercaptan blend [1] | 0.273 |
| Potassium oleate (pH 10.8) | 5.0 |
| Total water, including that in the activator composition | 126 |
| Glycerin | 54 |
| Cumene hydroperoxide (46.7%) | 0.36 (1.1 millimols) |
| Activator composition [3] | 14 |
| Ferrous sulfate.7H₂O | 0.31 (1.1 millimols) |
| Sodium pyrophosphate.10H₂O | 0.70 (1.56 millimols) |

[1] A blend of tertiary $C_{12}$, $C_{14}$, and $C_{16}$ mercaptans in a ratio of 3:1:1 parts by weight.
[2] A mixture of 5.0 g. $Na_4P_2O_7.10H_2O$, 2.2 g. $FeSO_4.7H_2O$, and sufficient water to make a volume of 100 ml. was prepared under nitrogen, heated in a 60° C. oven for 40 minutes, and cooled to room temperature before using.

The cumene hydroperoxide was dispersed in the water-glycerin solution of the emulsifying agent and this mixture charged to the reactor after which the mercaptan in admixture with the styrene was introduced. The butadiene was then charged and the reactor contents adjusted to a temperature of −10° C. Injection of the activator followed. The reactants were agitated at −10° C. for 8 hours, at which time a conversion of 59.2 per cent was attained. The reaction was short-stopped with approximately 0.4 per cent ditertiary butyl hydroquinone, stabilized with 2 per cent phenyl-beta-naphthylamine, coagulated by the salt-alcohol method, and dried. The gel-free product had a Mooney value of 55.5 and an inherent viscosity of 1.80.

Compounding of the polymer was effected according to the following recipe:

| | Parts by weight |
|---|---|
| Polymer | 100 |
| Carbon black [1] | 50 |
| Zinc oxide | 3 |
| Asphalt #6 | 10 |
| Sulfur | 1.75 |
| Santocure [2] | 1.2 |
| Stearite [3] | 1.5 |

[1] A channel black.
[2] N-cyclohexyl-2-benzothiazole sulfenamide.
[3] Hydrogenated fatty acids.

The samples were cured at 307° F. and physical tests made. Tests were also made on GR-S and natural rubber (smoked sheet) which were used as controls. Data are tabulated below:

| | Polymer | GR-S | Smoked Sheet |
|---|---|---|---|
| Stress-strain at 80° F.: | | | |
| 300% Elongation (p.s.i.) | | | |
| 20 Minutes Cure | 610 | 530 | 1,110 |
| 30 Minutes Cure | 860 | 800 | 840 |
| 45 Minutes Cure | 880 | 860 | 780 |
| 75 Minutes Cure | 870 | 1,030 | 660 |
| Break (p.s.i.): | | | |
| 20 Minutes Cure | 4,000 | 2,970 | 3,810 |
| 30 Minutes Cure | 4,670 | 3,120 | 3,600 |
| 45 Minutes Cure | 4,320 | 3,580 | 3,370 |
| 75 Minutes Cure | 3,920 | 2,270 | 3,130 |
| Elongation (Percent): | | | |
| 20 Minutes Cure | 725 | 720 | 610 |
| 30 Minutes Cure | 730 | 640 | 640 |
| 45 Minutes Cure | 680 | 670 | 650 |
| 75 Minutes Cure | 630 | 485 | 686 |
| Stress-strain at 200° F.: | | | |
| 300% Elongation (p.s.i.) | | | |
| 20 Minutes Cure | 680 | 660 | 700 |
| 45 Minutes Cure | 1,000 | 840 | 620 |
| Break (p.s.i.): | | | |
| 20 Minutes Cure | 2,300 | 1,060 | 3,120 |
| 45 Minutes Cure | | 1,140 | 2,760 |
| Elongation (Percent): | | | |
| 20 Minutes Cure | 670 | 410 | 720 |
| 45 Minutes Cure | | 350 | 700 |
| Stress-strain at 80° F., Oven Aged 24 hours at 212° F.: | | | |
| 300% Elongation (p.s.i.) | | | |
| 30 Minutes Cure | 1,700 | 1,680 | 1,260 |
| 75 Minutes Cure | 1,590 | | 910 |
| Break (p.s.i.): | | | |
| 30 Minutes Cure | 3,500 | 2,330 | 2,120 |
| 75 Minutes Cure | 3,490 | 1,470 | 1,680 |
| Elongation (Percent): | | | |
| 30 Minutes Cure | 505 | 380 | 470 |
| 75 Minutes Cure | 500 | 290 | 420 |
| Hysteresis, ΔT, °F.: | | | |
| 30 Minutes Cure | 71.5 | 74.2 | 48.8 |
| 45 Minutes Cure | 70.8 | 67.5 | 50.7 |
| Resilience (Percent): | | | |
| 30 Minutes Cure | 64.3 | 58.4 | 70.5 |
| 45 Minutes Cure | 64.5 | 60.6 | 70.2 |
| Hysteresis, Oven Aged, ΔT, °F.: | | | |
| 30 Minutes Cure | 58.0 | 59.0 | 47.2 |
| 45 Minutes Cure | 60.7 | 60.7 | 50.7 |
| Resilience, Oven Aged (Percent): | | | |
| 30 Minutes Cure | 68.9 | 65.4 | 72.0 |
| 45 Minutes Cure | 67.5 | 64.2 | 70.3 |
| Flex Life (Thousands of Flexures to Failure): | | | |
| 30 Minutes Cure | 37.2 | 17.0 | [1] 32 |
| 45 Minutes Cure | 35.1 | 10.0 | [1] 23 |
| Flex Life, Oven Aged: | | | |
| 30 Minutes Cure | 15.4 | 5.0 | 13.3 |
| 45 Minutes Cure | 12.3 | 6.5 | 26.2 |
| Abrasion Loss (Grams): | | | |
| 35 Minutes Cure | 6.13 | 8.23 | 8.49 |
| 35 Minutes Cure, Oven Aged | 5.86 | | |

[1] Percent broken at 50,000 flexures.

Example II

The following recipe was employed for effecting a series of butadiene-styrene copolymerizations:

| | Parts by weight |
|---|---|
| Butadiene | 70 |
| Styrene | 30 |
| Water | 116 |
| Glycerin | 54 |
| Mercaptan blend [1] | 0.25 |
| Potassium oleate | 5.0 |
| Cumene hydroperoxide (46.7%) | 0.72 (2.2 millimols) |
| Sodium pyrophosphate dissolved in the soap solution | 1.00 (2.24 millimols) |
| Sodium pyrophosphate used in the activator solution | 1.00 (2.24 millimols) |
| Activator composition [2] | 20 |

[1] A blend of tertiary $C_{12}$, $C_{14}$, and $C_{16}$ mercaptans in a ratio of 3:1:1 parts by weight.
[2] Ingredients present in addition to water: $FeSO_4.7H_2O$, 0.328 part (1.18 millimols); $Na_4P_2O_7.10H_2O$, 1.00 part (2.24 millimols).

In order to determine the effect of boiling the activator for varying lengths of time, six polymerizations were carried out according to the recipe given above. The procedure of Example I was followed, the temperature being maintained at −10° C. The following results were obtained.

| Time of Boiling (Minutes) | Conversion at 15.3 Hrs., Percent |
|---|---|
| 0 | 11 |
| 2.5 | 73 |
| 5.0 | 72 |
| 7.5 | 67 |
| 10.0 | 60 |
| 15.0 | 58 |

A similar series of runs was carried out in which the activator mixture was heated in a 60° C. oven for variable lengths of time. The results were as follows:

| Time of Heating (Minutes) | Conversion at 15.3 Hrs., Percent |
|---|---|
| 0 | 7.6 |
| 12 | 23.3 |
| 24 | 49.4 |
| 36 | 69.5 |
| 48 | 73.7 |
| 60 | 74.3 |

*Example III*

The recipe of Example II was followed for carrying out a series of butadiene-styrene copolymerizations except that varying amounts of ferrous sulfate were used in the preparation of the activator. The amount of sodium pyrophosphate used in the activator solution was 1.00 part. The following results were obtained.

| Ferrous Sulfate | | Mol Ratio $Fe''/P_2O_7$[1] | Conversion, Percent 15.3 Hrs. |
|---|---|---|---|
| Parts | Millimols | | |
| 0.20 | 0.72 | 1:3.1 | 32.1 |
| 0.27 | 0.97 | 1:2.31 | 64.8 |
| 0.35 | 1.26 | 1:1.78 | 76.4 |
| 0.44 | 1.58 | 1:1.42 | 82.7 |
| 0.62 | 2.2 | 1:1.02 | 76.2 |
| 0.85 | 3.1 | 1:0.72 | 30.6 |

[1] $P_2O_7$ in activator solution.

*Example IV*

A series of butadiene-styrene copolymerization runs was made using the recipe of Example II except that varying amounts of sodium pyrophosphate were used in the preparation of the activator. The amount of ferrous sulfate employed was 0.44 part. The results were as follows:

| Sodium Pyrophosphate[1] | | Mol Ratio $Fe''/P_2O_7$[1] | Conversion, Percent 15.3 Hrs. |
|---|---|---|---|
| Parts | Millimols | | |
| 0 | | | 2.9 |
| 0.6 | 1.34 | 1:0.85 | 78.6 |
| 1.0 | 2.24 | 1:1.42 | 79.2 |
| 1.5 | 3.36 | 1:2.13 | 71.8 |
| 2.0 | 4.48 | 1:2.83 | 47.8 |

[1] $P_2O_7$ in activator solution.

*Example V*

The recipe of Example I was employed for a series of polymerization runs except that 0.72 part of 46.7 per cent (2.2 millimols) cumenehydroperoxide was employed instead of 0.36 part and the amount of activator used was varied. In this and the following examples, all of the sodium pyrophosphate was added in the activator solution. The total amount of water was adjusted to 126 parts. The activator was prepared under nitrogen by mixing 5.0 grams sodium pyrophosphate ($Na_4P_2O_7.10H_2O$), 2.2 grams ferrous sulfate ($FeSO_4.7H_2O$), and sufficient water to make a volume of 100 ml., and heating the mixture in a 60° C. oven for 40 minutes. This material was cooled to room temperature before injection into the reactor. The amount of activator mixture, the mol ratio of cumene hydroperoxide to ferrous sulfate ($CHP/Fe''$), and the percent conversion at 15.4 hours are tabulated below:

| Activator, Parts | Mol Ratio $CPH/Fe''/P_2O_7$ | Conversion at 15.4 Hrs., Percent |
|---|---|---|
| 5 | 5.58:1:1.42 | 66.4 |
| 10 | 2.78:1:1.42 | 83.5 |
| 20 | 1.39:1:1.42 | 94.1 |
| 30 | 0.93:1:1.42 | 93.1 |
| 40 | 0.70:1:1.42 | 72.0 |

*Example VI*

The recipe of Example I was followed for a series of runs except that both the cumene hydroperoxide and the activator were varied. The aqueous activator composition was prepared as in Example I. The results are tabulated below:

| Cumene Hydroperoxide (46.7%) | | Activator, Parts of Aqueous Comp. | Time Required for 60% Conv., Hrs. |
|---|---|---|---|
| Parts | Millimols | | |
| 0.18 | 0.55 | 7 | 10.0 |
| 0.36 | 1.10 | 14 | 6.1 |
| 0.54 | 1.66 | 21 | 5.3 |
| 0.72 | 2.21 | 28 | 5.1 |
| 1.00 | 3.07 | 39 | 6.0 |
| 1.44 | 4.42 | 56 | 7.1 |

In each case the mol ratio of cumene hydroperoxide to ferrous salt to sodium pyrophosphate was 1:1:1.41.

*Example VII*

Butadiene was copolymerized with styrene according to the following recipe:

| | Parts by weight |
|---|---|
| Butadiene | 70 |
| Styrene | 30 |
| Mercaptan blend[1] | 0.25 |
| Potassium oleate, pH 10 | 5.0 |
| Sodium sulfate | 0.2 |
| Water | 130 |
| Methanol | 36 |
| Cumene hydroperoxide (46.7%) | 0.36 (1.10 millimols) |
| Activator[2] | 14 |
| Ferrous sulfate.$7H_2O$ | 0.31 (1.1 millimols) |
| Sodium pyrophosphate.$10H_2O$ | 0.70 (1.56 millimols) |

[1] A blend of tertiary $C_{12}$, $C_{14}$, and $C_{16}$ mercaptans in a ratio of 3 : 1 : 1 parts by weight.
[2] A mixture of 5.0 g. $Na_4P_2O_7.10H_2O$, 2.2 g. $FeSO_4.7H_2O$, and sufficient water to make a volume of 100 ml. was prepared under nitrogen, heated in an oven at 60° C. for 40 minutes, and cooled to room temperature before using.

Polymerization was effected in the usual manner at −10° C. A conversion of 57.5 per cent was attained in a 16.2-hour reaction period.

Compounding of the polymer and subsequent evaluation as in Example I gave comparable results to those reported in that example.

Two additional polymerization runs were made in the manner described above except that in one case 27 parts methanol was employed while in the other case the quantity added was 45 parts. In both instances the total quantity of water plus methanol was 180 parts. In a 16.2-hour reaction period the conversions had reached 62.3 and 46.0 per cent, respectively.

Example VIII

In order to illustrate the effect of pH, the recipe of Example VII was employed and the pH of the emulsifier was varied, by adding different amounts of potassium hydroperoxide to oleic acid. The results are shown below:

| pH of Emulsifier | Percent Conversion 16.5 Hours |
|---|---|
| 9.4 (Oleic Acid 90% Neutralized) | 53.2 |
| 9.6 (Oleic Acid 95% Neutralized) | 53.7 |
| 10.0 (Oleic Acid 100% Neutralized) | 57.6 |
| 11.1 (Oleic Acid 105% Neutralized) | 47.4 |
| 11.7 (Oleic Acid 115% Neutralized) | 28.8 |
| 11.9 (Oleic Acid 125% Neutralized) | 11.8 |

Example IX

Methylcyclohexane hydroperoxide was employed as the oxidizing agent in the following recipe:

| | Parts by weight |
|---|---|
| Butadiene | 70 |
| Styrene | 30 |
| Mercaptan blend [1] | 0.25 |
| Water | 139 |
| Methanol | 27 |
| Sodium sulfate | 0.3 |
| Potassium oleate | 5.0 |
| Methylcyclohexane hydroperoxide (11%) | 1.57 (1.2 millimols) |
| Activator [2] | 14 |
| Ferrous sulfate.7H$_2$O | 0.31 (1.1 millimols) |
| Sodium pyrophosphate.10H$_2$O | 0.70 (1.56 millimols) |

[1] A blend of tertiary $C_{12}$, $C_{14}$, and $C_{16}$ mercaptans in a ratio of 3:1:1 parts by weight.
[2] A mixture of 5.0 g. $Na_4P_2O_7 \cdot 10H_2O$, 2.2 g. $FeSO_4 \cdot 7H_2O$, and sufficient water to make a volume of 100 ml. was prepared under nitrogen, heated in an oven at 60° C. for 40 minutes, and cooled to room temperature before using.

Polymerization was effected in the usual manner at −10° C. A conversion of 25.8 per cent was reached in 16.3 hours. A similar polymerization run using 3.12 parts methylcyclohexane hydroperoxide (2.4 millimols) gave a conversion of 33.3 per cent in the same reaction period.

Example X

The activator for a butadiene-styrene copolymerization was prepared in the following manner: 5 g. of $Na_4P_2O_7 \cdot 10H_2O$ and 2.2 g. of $FeSO_4 \cdot 7H_2O$ were mixed with sufficient water to make 100 ml. and the material aged at 60° C. for 30 minutes. Preparation of this activator composition was effected in an atmosphere of nitrogen. The mixture was cooled to room temperature and centrifuged to separate the solid phase. The solid material was dried in vacuo in the presence of calcium chloride and in an atmosphere of nitrogen. The crystalline product was employed in a polymerization run using the following recipe:

| | Parts by weight |
|---|---|
| Butadiene | 70 |
| Styrene | 30 |
| Water | 136 |
| Methanol | 30 |
| Mercaptan blend | 0.25 |
| Cumene hydroperoxide (44.7%) | 0.37 |
| Sodium sulfate | 0.20 |
| Solid activator | 0.64 |
| Temperature, −10° C. | |

The amount of solid activator added was 0.64 gram and was introduced just prior to charging the butadiene. The conversion in a 16.6 hour reaction period was 55.9 per cent.

Example XI

Difference between polymerizations using recipes of the present invention and conventional recipes, wherein a reducing sugar is an essential ingredient and a greater relative amount of an alkali metal pyrophosphate is used, can be shown by using activator ingredients in the ratio ordinarily employed in a sugar recipe at higher temperatures and decreasing the polymerization temperature to −10° C. The following recipe gave a 72 per cent conversion in 3.9 hours when the reaction was carried out at 30° C.

| | Parts by weight |
|---|---|
| Butadiene/styrene | 72/28 |
| Rosin soap, sodium salt, pH 10 | 3.5 |
| Soap flakes | 1.2 |
| Water | 180 |
| Mercaptan blend [1] | 0.4 |
| Cumene hydroperoxide (100%) | 0.15 (0.98 millimol) |
| Ferrous sulfate, $FeSO_4 \cdot 7H_2O$ | 0.1 (0.36 millimol) |
| Sodium pyrophosphate, $Na_4P_2O_7 \cdot 10H_2O$ | 1.0 (2.2 millimols) |
| Glucose | 1.0 |

[1] A blend of tertiary $C_{12}$, $C_{14}$, and $C_{16}$ mercaptans in a ratio of 3:1:1 parts by weight.

A similar polymerization using the same ratio of activator ingredients but carrying out the reaction at −10° C. required 48 hours to reach a 71 per cent conversion. In this run the following recipe was employed.

| | Parts by weight |
|---|---|
| Butadiene/styrene | 70/30 |
| Water/glycerin | 126/54 |
| Potassium oleate, pH 10 | 5.0 |
| Potassium hydroxide, excess | 0.10 |
| Mercaptan blend | 0.172 |
| Cumene hydroperoxide (100%) | 0.115 (0.75 millimol) |
| Ferrous sulfate, $FeSO_4 \cdot 7H_2O$ | 0.10 (0.36 millimol) |
| Sodium pyrophosphate, $Na_4P_2O_7 \cdot 10H_2O$ | 1.0 (2.2 millimols) |
| Sorbose | 3.0 |

In each of these two runs the mol ratio of ferrous sulfate to sodium pyrophosphate was 1:6.1.

The results of the two preceding runs are submitted as contrast to those given in preceding examples, in which the ferrous sulfate to sodium pyrophosphate mol ratio is less than 1:3. We wish to emphasize that in polymerizations using a cumene hydroperoxide-sugar recipe the mol ratio of the activator ingredients is quite different from that used in sugar-free formulations.

Example XII

A series of polymerization runs was carried out at −10° C. in which the ratio of ferrous sulfate to sodium pyrophosphate was varied. The following recipe was employed.

| | Parts by weight |
|---|---|
| Butadiene/styrene | 70/30 |
| Water/methanol | 192/48 |
| Potassium laurate (95% neutralized) | 5.0 |
| Cumene hydroperoxide (100%) | 0.152 (1 millimol) |
| Mercaptan blend [1] | 0.25 |
| Ferrous sulfate, $FeSO_4 \cdot 7H_2O$ | 0.278 (1 millimol) |
| Sodium pyrophosphate, $Na_4P_2O_7 \cdot 10H_2O$ | Variable |

[1] A blend of tertiary $C_{12}$, $C_{14}$, and $C_{16}$ mercaptans in a ratio of 3:1:1 parts by weight.

The following results were obtained:

| $Na_4P_2O_7$ Millimols | Conversion, Percent | |
|---|---|---|
| | 7.6 Hours | 10 Hours |
| 0.5 | 17.9 | 25.7 |
| 0.8 | 38.3 | 55.0 |
| 1.0 | 38.7 | 52.7 |
| 1.3 | 37.7 | 50.3 |
| 1.5 | 31.5 | 39.5 |

Using the same recipe with 1.0 millimol (0.446 part) sodium pyrophosphate and varying the ferrous sulfate gave the following results:

| $FeSO_4 \cdot 7H_2O$ Millimols | Conversion, Percent 7.2 Hrs. |
|---|---|
| 0.5 | 17.3 |
| 0.8 | 24.5 |
| 1.0 | 41.5 |
| 1.5 | 25.8 |
| 2.0 | 23.8 |
| 2.5 | 1.0 |

A third series of runs was carried out in which 1.0 millimol each of ferrous sulfate and sodium pyrophosphate was employed but the amount of cumene hydroperoxide was varied. The results are tabulated below:

| Cumene Hydroperoxide Millimols | Conversion, Percent 6.7 Hrs. |
|---|---|
| 0.5 | 6.3 |
| 0.8 | 15.6 |
| 1.0 | 36.4 |
| 1.3 | 37.2 |
| 1.5 | 36.2 |
| 2.0 | 37.1 |

A fourth series of polymerization runs was carried out using a mol ratio of ferrous sulfate/sodium pyrophosphate/cumene hydroperoxide of 1:1:1.1 but varying the millimol concentration of each ingredient from 0.25 to 5.0. The following data were obtained.

| Millimols of Each Activator Ingredient | Conversion, Percent | |
|---|---|---|
| | 7.5 Hours | 10.5 Hours |
| 0.25 | 12.3 | 14.6 |
| 0.60 | 29.7 | 34.5 |
| 1.0 | 39.6 | 51.4 |
| 1.5 | 47.6 | 65.3 |
| 2.0 | 49.8 | 70.2 |
| 2.5 | 51.0 | 71.1 |
| 3.5 | 48.6 | 67.8 |
| 5.0 | 3.2 | 3.8 |

These unusually rapid conversion rates using the methanol recipe are particularly significant.

Example XIII

A polymer containing only a small amount of bound styrene was prepared, at a polymerization temperature of −10° C., using the following recipe.

| | Parts by weight |
|---|---|
| Butadiene | 90 |
| Styrene | 10 |
| Water | 167 |
| Methanol | 33 |
| Potassium laurate | 5 |
| Mixed tertiary alkyl mercaptans ($C_{12}$, $C_{14}$, $C_{16}$) | 0.18 |
| Cumene hydroperoxide (100%) | 0.165 (1.1 millimols) |
| Potassium chloride | 0.4 |
| Activator: | |
| Ferrous sulfate heptahydrate | 0.31 (1.1 millimols) |
| Sodium pyrophosphate (anhyd.) | 0.70 (2.6 millimols) |

In a batch operation the monomeric material was 60.9 per cent converted in 17.5 hours. The product was gel-free, contained 8.1 per cent bound styrene, the ML4 viscosity was 48 and the intrinsic viscosity was 2.00. After compounding and curing, the product was found to be superior to GR-S and GR-S-10 controls in all properties.

Example XIV

A butadiene-styrene copolymerization is carried out using the following recipe:

| | Parts by weight |
|---|---|
| Butadiene | 70 |
| Styrene | 30 |
| Mercaptan blend [1] | 0.25 |
| Potassium oleate (pH 10.8) | 5.0 |
| Total water, including that in the activator composition | 180 |
| Cumene hydroperoxide (100%) | 0.36 (2.36 millimols) |
| Activator [2] | 20 |
| Ferrous sulfate $\cdot 7H_2O$ | 0.44 (1.58 millimols) |
| Sodium pyrophosphate $\cdot 10H_2O$ | 1.0 (2.24 millimols) |

[1] A blend of tertiary $C_{12}$, $C_{14}$, and $C_{16}$ mercaptans in a ratio of 3:1:1 parts by weight.
[2] A mixture of 5.0 g. $Na_4P_2O_7 \cdot 10H_2O$, 2.2 g. $FeSO_4 \cdot 7H_2O$, and sufficient water to make a volume of 100 ml. was prepared under nitrogen, heated in a 60° C. oven for 40 minutes, and cooled to room temperature before using.

The cumene hydroperoxide dispersed in the water solution of the emulsifying agent is charged to the reactor, after which the mercaptan in admixture with the styrene is introduced. The butadiene is then charged and the reactor contents adjusted to a temperature of 10° C. The activator is introduced continuously over a 6-hour period while the reactants are agitated and the temperature maintained at 10° C. Agitation is continued ten minutes after the completion of addition of the activator. The reaction is short-stopped with approximately 0.4 per cent ditertiary butyl hydroquinone, stabilized with 2 per cent phenyl-beta-naphthylamine, coagulated by the salt-acid method, and dried. The conversion reached is 60 per cent.

A similar polymerization run carried out as above except for charging the entire quantity of activator at the beginning of the reaction shows a rapid initial conversion but polymerization substantially stops at the end of 4 hours. The following data are presented:

| Time, Hours | Conversion, Percent |
|---|---|
| 1 | 24 |
| 4 | 26 |

Example XV

The following recipe is employed for effecting a butadiene-styrene copolymerization.

| | Parts by weight |
|---|---|
| Butadiene | 70 |
| Styrene | 30 |
| Mercaptan blend [1] | 0.3 |
| Potassium oleate (pH 10.8) | 5.0 |
| Total water, including that in the activator composition | 180 |
| Cumene hydroperoxide (46.7%) | 0.72 |
| Activator [2] | 20 |

[1] A blend of tertiary $C_{12}$, $C_{14}$, and $C_{16}$ mercaptans in a ratio of 3:1:1 parts by weight.
[2] A mixture prepared as in Example XIV except containing 3.0 g. ferrous sulfate, 4.0 g. sodium pyrophosphate and sufficient water to make a volume of 100 ml.

Polymerization is carried out at 20° C. for a 4-hour period following the procedure of Example XIV, except that eight equal portions of the activator are introduced, the first portion initially and the remaining portions at intervals of 0.5 hour. A conversion of 59.6 per cent is realized.

A similar run in which all the activator is charged initially shows a conversion of 35 per cent in four hours. No further polymerization occurs at the end of an 8-hour period.

Example XVI

Using the procedure of Example XV and adding the activator continuously gives a 58 per cent conversion in 4 hours when the polymerization is carried out at 30° C. A similar run in which all the activator is charged initially shows a 19 per cent conversion in four hours and at this point there is no further evidence of reaction.

Example XVII

The recipe and procedure of Example XIV are employed except that the ferrous pyrophosphate activator is charged initially with the other ingredients and the cumene hydroperoxide is introduced continuously over a 6-hour period. The temperature is held at 10° C. The conversion reached is 57 per cent.

Example XVIII

The following example, using sodium alkyltoluene sulfonate as the emulsifier, illustrates the effect of increment addition of activator ingredients on conversion rate. The recipe used was as follows:

| | Parts by weight |
|---|---|
| Butadiene/styrene | 70/30 |
| Water | 170 |
| Sodium alkyl (C$_{12}$H$_{25}$) toluene sulfonate, pH 10.5 | 5.0 |
| Mercaptan blend | 0.25 |
| Cumene hydroperoxide (44.6%) | 0.78 (2.3 millimols) |
| Activator solution containing | 20 |
| FeSO$_4$.7H$_2$O | 0.62 (2.2 millimols) |
| Na$_4$P$_2$O$_7$.10H$_2$O | 1.4 (3.14 millimols) |

Polymerization was effected at 5° C. The addition of cumene hydroperoxide and activator ingredients is shown in the following table together with the conversion:

| Initiator at Start | Addition at 13 Hours | Conversion, percent | | | |
|---|---|---|---|---|---|
| | | 2 Hrs. | 6 Hrs. | 12 Hrs. | 20 Hrs. |
| 0.39 CHP+10 ml. activator soln | 0.39 CHP+10 ml. activator soln | 10 | 24 | 26 | 71 |
| 0.78 CHP+10 ml. activator soln | 10 ml. activator soln | 9 | 23 | 24 | 71 |

This example shows that at this above-freezing temperature, polymerization stops after six hours but even after 13 hours it can be started easily and carried to the desired level by the addition of either the activator solution alone or by the addition of both activator and cumene hydroperoxide.

Obviously when polymerizations are carried out in aqueous emulsion in the absence of freezing point depressants, temperatures much below the freezing point of water cannot be employed. The use of various additive agents, however, makes a process of the type disclosed herein applicable at lower temperatures, and, in fact, this is one of the distinct advantages of the present invention. Examples of a suitable low temperature system is a glycerin-water solution or a methanol-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

As will be evident to those skilled in the art, various modifications of this invention can be made, or followed, in the light of the foregoing disclosure and discussion, without departing from the spirit or scope of the disclosure or from the scope of the claims.

We claim:

1. In the production of synthetic rubber by copolymerization in aqueous emulsion of a monomeric material comprising 1,3-butadiene and styrene in a weight ratio of at least 65:35, the improvement which comprises effecting said polymerization at a temperature between 0 and −40° C. in the presence of an aqueous medium and in the presence of ferrous sulfate and sodium pyrophosphate and phenyl (dimethyl) hydroperoxymethane, and in the absence of an organic reductant, with a mol ratio of said compounds of 1:1:1–1.1 and with the amount of each between 0.1 and 2.5 millimols per 100 parts by weight of said monomeric material, and with an alkaline emulsifying agent and the pH of said aqueous medium between 9 and 11.8.

2. In the production of synthetic rubber by polymerization in aqueous emulsion of a monomeric material comprising 1,3-butadiene, the improvement which comprises effecting said polymerization in the presence of a ferrous compound soluble in said aqueous medium and a pyrophosphate soluble in said aqueous medium and phenol (dimethyl) hydroperoxymethane, with a mol ratio of said compounds of 1:1:1–1.1 and with the amount of each between 0.1 and 2.5 millimols per 100 parts by weight of said monomeric material, in the absence of an organic reductant as a constituent of the catalytic composition and with an alkaline emulsifying agent and the pH of said aqueous medium between 9 and 11.8, with addition of portions of the total quantity of said ferrous compound and said pyrophosphate from time to time during the course of said polymerization at least when the polymerization does not otherwise progress steadily.

3. In the production of synthetic rubber by copolymerization of a major proportion of 1,3-butadiene and a minor proportion of styrene in an alkaline aqueous emulsion in the presence of an activator composition comprising ferrous sulfate, an alkali metal pyrophosphate, and phenyl (dimethyl) hydroperoxymethane, the improvement which comprises conducting said polymerization in the absence of an organic reductant and with a mol ratio of ferrous sulfate, pyrophosphate and phenyl (dimethyl) hydroperoxymethane of 1:1:1–1.1 and with an amount of each constituent between 0.1 and 2.5 millimols per 100 parts by weight of monomeric material, and with the pH of said aqueous medium between 9 and 11.8, with addition of portions of the total quantity of said ferrous compound and said pyrophosphate from time to time during the course of said polymerization at least when the polymerization does not otherwise progress steadily.

4. In a process for polymerizing an organic monomeric material comprising an unsaturated organic compound containing a $CH_2=C<$ group while dispersed in an aqueous emulsion in the presence of a water-soluble compound of a multivalent heavy metal, a water-soluble pyrophosphate, and an organic hydroperoxide, the improvement which comprises effecting said polymerization in the absence of an organic reductant and with a mol ratio of said constituents of 1:1:1–1.1 and with an amount of each constituent between 0.1 and 2.5 millimols per 100 parts by weight of monomeric material, and with the pH of said aqueous medium between 9 and 11.8, with addition of portions of the total quantity of said multivalent heavy metal compound and said pyrophosphate from time to time during the course of said polymerization at least when the polymerization does not otherwise progress steadily.

5. In the production of synthetic rubber by copolymerization in aqueous emulsion of a monomeric material comprising a major amount of 1,3-butadiene and a minor amount of styrene, the improvement which comprises effecting said polymerization at 0 to $-40°$ C. in the presence of ferrous sulfate, an alkali metal pyrophosphate and phenyl (dimethyl) hydroperoxymethane with the amount of each between 0.1 and 2.5 millimols per 100 parts by weight of said monomeric material and with the mol ratio of ferrous sulfate to said pyrophosphate between 1:0.2 and 1:3.5, and in the absence of an organic reductant as a constituent of the catalytic composition.

6. In the production of synthetic rubber by copolymerization in aqueous emulsion of a monomeric material comprising a major amount of 1,3-butadiene and a minor amount of styrene, the improvement which comprises effecting said polymerization at 0 to $-40°$ C. in the presence of 0.1 to 3 millimols of ferrous sulfate, 0.1 to 5.6 millimols of sodium pyrophosphate, and 0.1 to 10 millimols of phenyl (dimethyl) hydroperoxymethane, all per 100 parts by weight of said monomeric material, in the absence of an organic reductant as a constituent of the catalytic composition and with the mol ratio of ferrous sulfate to pyrophosphate not less than 1:3.5.

7. In a process for polymerizing an organic monomeric material comprising an unsaturated organic compound containing a $CH_2=C<$ group while dispersed in an aqueous emulsion in the presence of a water-soluble compound of a multivalent metal capable of existing in each of two valence states, a water-soluble pyrophosphate, and an organic hydroperoxide, the improvement which comprises effecting said polymerization with the amount of each said component limited to 0.1 to 3 millimols of said metal compound, 0.10 to 5.6 millimols of pyrophosphate, and 0.1 to 10 millimols of organic hydroperoxide, all per 100 parts by weight of said monomeric material, in the absence of an organic reductant as a constituent of the catalytic composition and with the mol ratio of said multivalent metal compound to pyrophosphate not less than 1:3.5, and with the pH of said aqueous medium between 9 and 11.8, with addition of portions of the total quantity of said multivalent heavy metal compound and said pyrophosphate from time to time during the course of said polymerization at least when the polymerization does not otherwise progress steadily.

8. In a process for polymerizing an organic monomeric material comprising an unsaturated organic compound containing a $CH_2=C<$ group while dispersed in an aqueous emulsion in the presence of a water-soluble ferrous compound, a water-soluble pyrophosphate, and an organic hydroperoxide, the improvement which comprises effecting said polymerization with the amount of each said component limited to 0.1 to 2.5 millimols of said ferrous compound, 0.1 to 4 millimols of pyrophosphate, and 0.1 to 5 millimols of organic hydroperoxide, all per 100 parts by weight of said monomeric material, in the absence of an organic reductant as a constituent of the catalytic composition and with the mol ratio of ferrous compound to pyrophosphate between 1:0.35 and 1:2.8, and with the pH of said aqueous medium between 9 and 11.8, with addition of portions of the total quantity of said ferrous compound and said pyrophosphate from time to time during the course of said polymerization at least when the polymerization does not otherwise progress steadily.

9. In the production of synthetic rubber by polymerization in an aqueous emulsion of a monomeric material comprising a major proportion of 1,3-butadiene and a minor proportion of styrene, the improvement which comprises effecting said polymerization at a temperature between $-40$ and $+70°$ C. in the presence of ferrous sulfate and sodium pyrophosphate and phenyl (dimethyl) hydroperoxymethane, and in the absence of an organic reductant, with a mol ratio of the total amounts of said constituents used during said polymerization of 1:1:1–1.1 and with the amount of each being between 0.1 and 2.5 millimols per 100 parts of said monomeric material, with the pH of said aqueous medium between 9 and 11.8, adding all of said phenyl (dimethyl) hydroperoxymethane at the start of said polymerization, and adding only a portion of said pyrophosphate and ferrous sulfate at the start of said polymerization and adding additional portions thereof a plurality of times throughout the course of said polymerization.

10. In the production of synthetic rubber by polymerization in an aqueous emulsion of a monomeric material comprising a major proportion of 1,3-butadiene and a minor proportion of styrene, the improvement which comprises effecting said polymerization at a temperature between $-40$ and $+70°$ C. in the presence of ferrous sulfate and sodium pyrophosphate and phenyl (dimethyl) hydroperoxymethane, and in the absence of an organic reductant, with a mol ratio of the total amounts of said constituents used during said polymerization of 1:1:1–1.1 and with the amount of each being between 0.1 and 2.5 millimols per 100 parts of said monomeric material, with the pH of said aqueous medium between 9 and 11.8, and adding at least one of said constituents a plurality of times throughout the course of said polymerization.

11. In a process for polymerizing an organic monomeric material comprising an unsaturated organic compound containing a $CH_2=C<$ group while dispersed in an aqueous emulsion, the improvement which comprises effecting said polymerization at 0 to −40° C. in the presence of 0.1 to 3 millimols of ferrous sulfate, 0.1 to 5.6 millimols of sodium pyrophosphate, and 0.1 to 10 millimols of phenyl (dimethyl) hydroperoxymethane, all per 100 parts by weight of said monomeric material, with the pH of said aqueous medium between 9 and 11.8, in the absence of an organic reductant as a constituent of the catalytic composition and with the mol ratio of ferrous sulfate to pyrophosphate not less than 1:3.5.

12. An improved process for the production of synthetic rubber by polymerization in aqueous emulsion of a monomeric material comprising a conjugated diene, which comprises adding to an aqueous emulsion of such a monomeric material having a pH between 9 and 11.8, 0.1 to 20 millimols of phenyl (dimethyl) hydroperoxymethane and an aqueous activator solution prepared by dissolving together a soluble ferrous salt and a soluble pyrophosphate and heating said solution above 50° C., and subsequently cooling same, the amount and composition of said activator solution being such that there is added to said aqueous emulsion 0.1 to 3 millimols of iron and 0.1 to 5.6 millimols of pyrophosphate, with the mol ratio of iron to pyrophosphate being between 1:0.2 and 1:3.5, and polymerizing said monomeric material in the absence of an organic reductant as a constituent of the catalytic composition and with addition of portions of the total quantity of said ferrous compound and said pyrophosphate from time to time during the course of said polymerization at least when the polymerization does not otherwise progress steadily.

13. The process of claim 12 in which said polymerization is conducted at a temperature between 0 and −40° C. and the mol ratio of phenyl (dimethyl) hydroperoxymethane to iron to pyrophophate added to said emulsion is 1:1:1−1:1.

14. The process of claim 12 in which said polymerization is conducted at a temperature between 0 and 70° C., the mol ratio of phenyl (dimethyl) hydroperoxymethane to iron to pyrophosphate added to said emulsion is 1:1:1−1.1, and said aqueous activator solution is added to said emulsion in increments throughout the course of said polymerization.

15. In the production of a polymer of high molecular weight by polymerization in aqueous emulsion of a monomeric material comprising a conjugated diene, the improvement which comprises effecting said polymerization at 0 to −40° C. in the presence of 0.1 to 3 millimols of ferrous sulfate, 0.1 to 5.6 millimols of sodium pyrophosphate, and 0.1 to 10 millimols of phenyl-(dimethyl) hydroperoxymethane, all per 100 parts by weight of said monomeric material, in the absence of an organic reductant as a constituent of the catalytic composition and with the mol ratio of ferrous sulfate to pyrophosphate not less than 1:3.5.

16. An improved process for polymerizing an organic monomeric material comprising an unsaturated organic compound containing a $CH_2=C<$ group and polymerizable while dispersed in an aqueous medium, which comprises polymerizing such a monomeric material while dispersed in an aqueous medium in the presence of 0.1 to 1 millimols of an organic hydroperoxide, 0.1 to 3 millimols of a water-soluble salt of a multivalent metal capable of existing in each of two valence states, and 0.1 to 5.6 millimols of a water-soluble pyrophosphate, all per 100 parts by weight of said monomeric material, in the absence of an organic reductant as a constituent of the catalytic composition and with the mol ratio of said metal salt to pyrophosphate not less than 1:3.5, with addition of portions of the total quantity of said ferrous compound and said pyrophosphate from time to time during the course of said polymerization at least when the polymerization does not otherwise progress steadily.

CHARLES F. FRYLING.
CARL A. URANECK.

REFERENCES CITED

The following references are of record in the file of this patent:

UNITED STATES PATENTS

| Number | Name | Date |
|---|---|---|
| 2,546,220 | Fryling et al. | Mar. 27, 1951 |
| 2,569,480 | Lorand | Oct. 2, 1951 |

OTHER REFERENCES

Vandenberg et al., "Cumene Hydroperoxide in Redox Polymerization Emulsion," Ind. and Eng. Chem., vol. 40, May 1948, pp. 932–937.

Shearon, Jr., et al., "Low Temperature Manufacture of Chemical Rubber," Ind. and Eng. Chem., vol. 40, May 1948, pp. 769–777.